(12) United States Patent
Miller

(10) Patent No.: US 10,227,766 B1
(45) Date of Patent: Mar. 12, 2019

(54) STORMWATER MANAGEMENT SYSTEM

(71) Applicant: Lane Enterprises, Inc., Camp Hill, PA (US)

(72) Inventor: Kevin Marshall Miller, Spring, TX (US)

(73) Assignee: Lane Enterprises, Inc., Camp Hill, PA (US)

( * ) Notice: Subject to any disclaimer, the term of this patent is extended or adjusted under 35 U.S.C. 154(b) by 0 days.

(21) Appl. No.: 15/707,698

(22) Filed: Sep. 18, 2017

Related U.S. Application Data

(60) Provisional application No. 62/397,153, filed on Sep. 20, 2016, provisional application No. 62/404,301, filed on Oct. 5, 2016.

(51) Int. Cl.
| | | |
|---|---|---|
| *E03F 1/00* | (2006.01) | |
| *E02D 29/045* | (2006.01) | |
| *C02F 1/00* | (2006.01) | |
| *E03B 11/14* | (2006.01) | |
| *E02B 11/00* | (2006.01) | |
| *C02F 103/00* | (2006.01) | |

(52) U.S. Cl.
CPC .............. *E03F 1/003* (2013.01); *C02F 1/001* (2013.01); *E02B 11/005* (2013.01); *E02D 29/045* (2013.01); *E03B 11/14* (2013.01); *C02F 2103/001* (2013.01)

(58) Field of Classification Search
CPC ... E03F 1/002; E03F 1/003; E03F 5/14; C02F 2103/001; E02B 11/005
USPC ................ 210/170.03, 170.08, 747.2, 747.3; 405/43, 45, 46
See application file for complete search history.

(56) References Cited

U.S. PATENT DOCUMENTS

| | | | | |
|---|---|---|---|---|
| 4,188,154 A * | 2/1980 | Izatt | ...................... | E02B 11/005 405/43 |
| 4,245,924 A * | 1/1981 | Fouss | ..................... | E02B 11/005 138/119 |
| 5,480,260 A * | 1/1996 | Shattuck | ............... | E02B 11/005 405/36 |
| 6,616,834 B2 * | 9/2003 | Anderson | .......... | B01D 21/0012 210/170.08 |
| 6,991,734 B1 | 1/2006 | Smith et al. | | |
| 8,062,531 B1 * | 11/2011 | LoBello | .................. | E03F 1/005 210/170.03 |
| 8,147,688 B2 * | 4/2012 | Adams | .................... | E03F 1/002 210/170.03 |

(Continued)

FOREIGN PATENT DOCUMENTS

| | | | |
|---|---|---|---|
| CA | 2732492 | | 8/2011 |
| DE | 102008011432 | * | 9/2009 |
| WO | WO 2017/095737 | * | 6/2017 |

OTHER PUBLICATIONS

Advanced Drainage Systems, Inc., Isolator® Row O&M Manual, manual, 2013, 4 pages.

*Primary Examiner* — Christopher Upton
(74) *Attorney, Agent, or Firm* — Hooker & Habib, P.C.

(57) ABSTRACT

An underground stormwater management system includes a first-flush chamber that receives the first flush. The chamber removably holds filter cartridges that close the chamber and filter the first flush as the first flush drains out of the chamber and into an underlying porous substrate. When the filter cartridges are used up, they can be replaced with new filter cartridges.

20 Claims, 4 Drawing Sheets

(56) References Cited

U.S. PATENT DOCUMENTS

| | | | | |
|---|---|---|---|---|
| 8,894,866 B1* | 11/2014 | Belasco | ............... | E03F 1/003 210/747.2 |
| 2007/0258770 A1* | 11/2007 | Miskovich | ............ | E03F 1/003 405/43 |

* cited by examiner

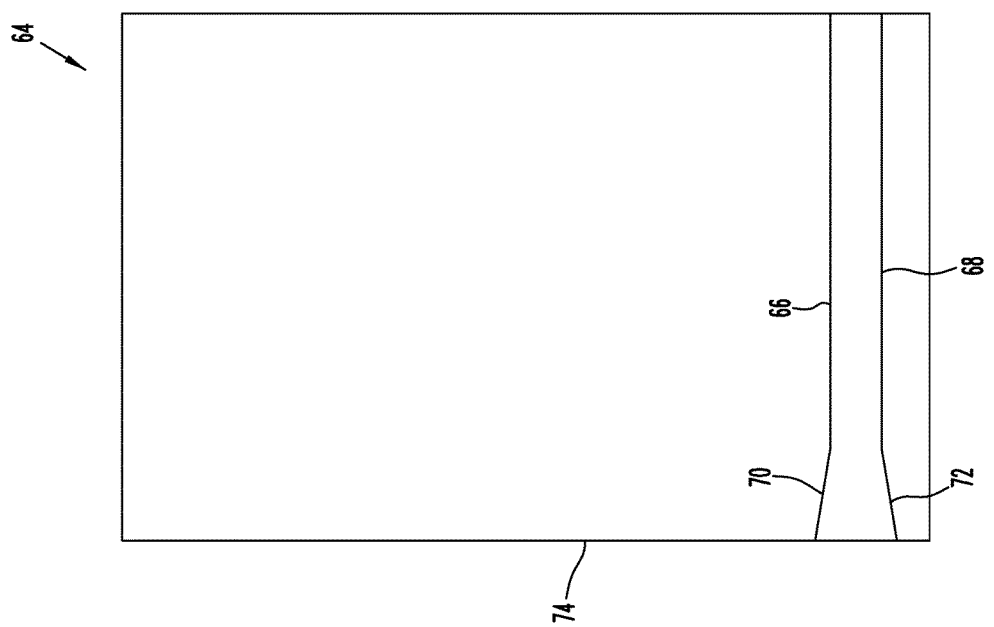

STORMWATER MANAGEMENT SYSTEM

CROSS REFERENCE TO RELATED APPLICATIONS

This application claims the benefit of U.S. Provisional Patent Application No. 62/397,153 filed on 20 Sep. 2016 titled "Stormwater Management System", and also claims the benefit of U.S. Provisional Patent Application No. 62/404,301 filed on 5 Oct. 2016 titled "Stormwater Management System", each of the priority provisional patent applications being incorporated by reference in its entirety as if fully set forth herein.

FIELD OF THE DISCLOSURE

The disclosure relates generally to stormwater management systems, and in particular to underground stormwater management systems.

BACKGROUND OF THE DISCLOSURE

Stormwater runoff includes the initial runoff or "first flush" that contains sediments, oil, and other pollutants flushed from surface areas, and other runoff that can be considered essentially pollution-free. The pollution-free runoff includes the later runoff from the surface areas that generated the first flush, and runoff from areas without surface pollutants. In major storm events the volume of non-first flush is substantially greater than the volume of first flush.

Stormwater treatment systems have been developed to remove pollutants from the first flush. Conventional first flush treatment systems include systems that pass the first flush through a filter to remove pollutants. The filter can be a relatively inexpensive low-head filter because of the relatively low volume and flow of runoff to be filtered.

Underground stormwater management systems have also been developed that receive runoff at a high rate during a major storm event, and discharge the runoff at a lower rate to a storm drain. Such systems include an underground storage chamber that receives and stores the water that accumulates while the flow into the storage chamber is greater than the discharge out. The water discharges at a relatively high head from the storage chamber to enable discharge near the maximum discharge rate allowed by applicable law or regulation. The discharge is normally not filtered, but if filtering is desired an expensive high-head filter must be used because of the high volume and flow of runoff being filtered.

Stormtech LLC, Wethersfield, Conn., markets an underground stormwater management system that includes an open-bottomed chamber that receives the first flush. The chamber is placed on stone base. A woven geotextile sheet is placed between the chamber and the stone base. The geotextile filters sediment from the first flush as the first flush leaves the chamber through the stone base.

Accumulated sediment in the chamber must be periodically removed. Access to the chamber is provided by a manhole located on an end of the chamber. A high-pressure water spray is used to flush the sediment off the geotextile sheet and back into the manhole for vacuuming.

An underground stormwater management system that captures first flush in a chamber and filters sediment from the first flush leaving the chamber but without the need for a high-pressure water spray to remove the accumulated sediment is desired.

SUMMARY OF THE DISCLOSURE

Disclosed is an underground stormwater management system that captures first flush in a chamber and filters sediment from the first flush leaving the chamber without the need for a high-pressure water spray to remove the accumulated sediment.

In possible embodiments of the disclosed system, the first flush is filtered through a geotextile. In other possible embodiments of the disclosed system, the first flush is filtered through a thickness of filter material. In yet other possible embodiments of the disclosed system the first flush is filtered through a geotextile and through a thickness of an additional filter material.

The disclosed system includes a chamber configured to be placed on a porous underlying substrate, locating structure attached to the chamber, and one or more filter cartridges that are removably held in the chamber by the locating structure. The one or more filter cartridges are preferably positioned by the locating structure to be closely spaced from the stone base.

In possible embodiments, the system includes a number of filter cartridges. This allows a filter cartridge to fit within a manhole adjacent an end of the chamber for insertion into or removal from the chamber. Filter cartridges are held by the locating structure and slid along the length of the chamber for insertion into the chamber. Filter cartridges after sufficient use are removed by sliding the filter cartridges held by the locating structure along the chamber and out of the chamber.

A filter cartridge may include a metal or plastic body that is wrapped in a geotextile sheet. The body may define an interior chamber for storing additional filter material. The additional filtering material may be sand or other conventional stormwater filtering material. Openings in the body separated by the filter material in the body allow flow of liquid into and out and through the additional filter material.

In possible embodiments of the filter body the geotextile sheet may be eliminated and only the filtering material in the body is used for filtering the first flush.

Other objects and features of the disclosure will become apparent as the description proceeds, especially when taken in conjunction with the accompanying drawing sheets illustrating one or more illustrative embodiments.

BRIEF SUMMARY OF THE DRAWINGS

FIG. 7 is a vertical sectional view along the length of a chamber module.

DETAILED DESCRIPTION

Figure 1:
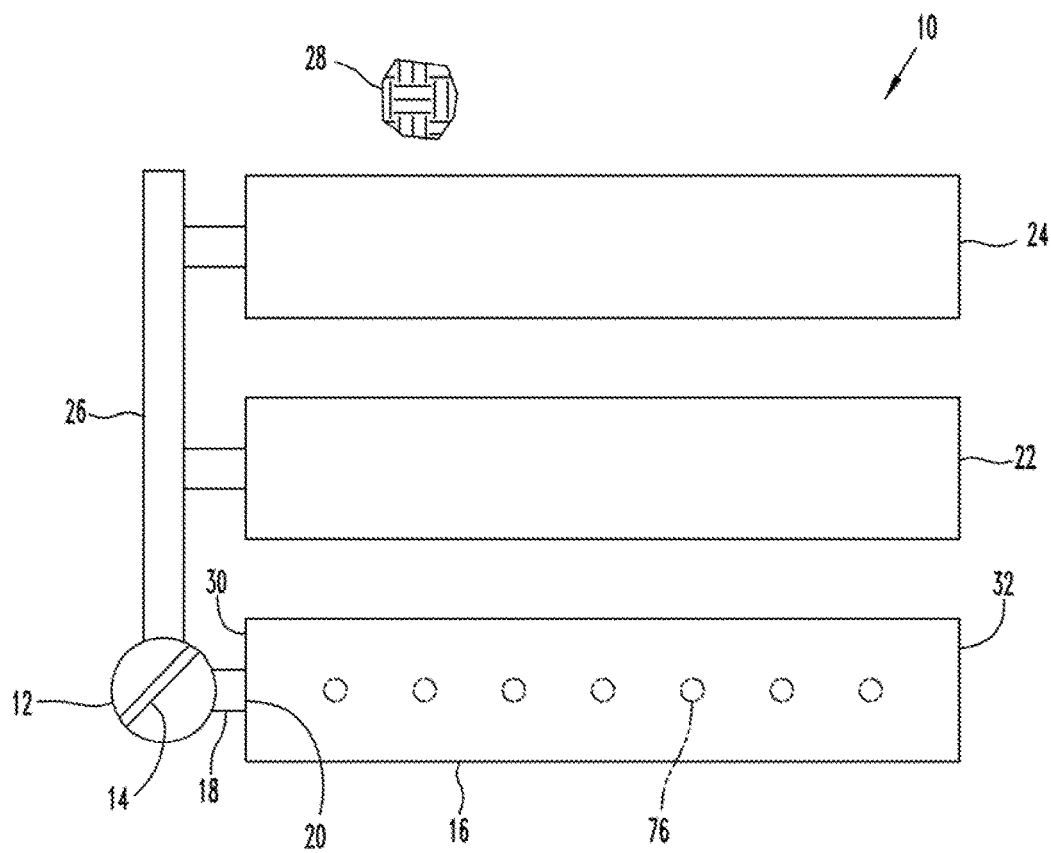
FIG. 1 is a simplified top view of an underground stormwater management system in accordance with the present disclosure.

FIG. 1 illustrates a subterranean, underground stormwater management system 10. The system 10 includes a manhole 12 with a diverter wall 14. The manhole 12 receives stormwater and the diverter wall diverts first flush to a first flush chamber 16 through a first conduit 18. The chamber 16 has a water inlet 20 aligned with the discharge end of the conduit that receives the first flush into the chamber. Overflow over the diverter wall 14 flows into additional storage chambers (in the illustrated embodiment overflow chambers 22 and 24) through a second conduit 26.

The system 10 is covered by an overlaying aggregate material in a conventional manner (and so will not be described in detail). To simplify the drawings, the entire overlying aggregate material is represented by the material portion 28.

Figure 2:
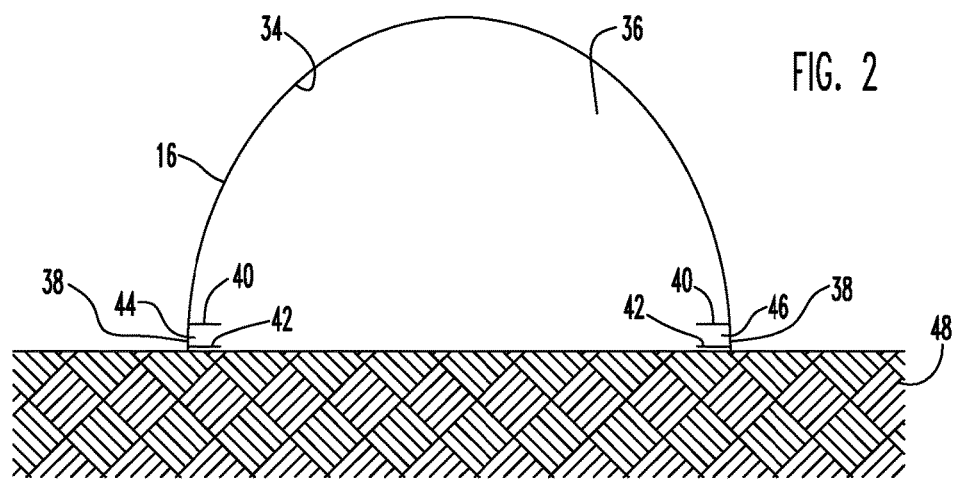
FIG. 2 is an end view of a chamber of the system shown in FIG. 1.

FIG. 2 is an end view of the first flush chamber 16. The illustrated chamber 16 has a maximum width of about 4 feet, is about 8 feet long, and is made of polypropylene, HDPE, or other suitable material.

The chamber 16 is an elongate chamber having opposed first and second ends 30, 32 (see FIG. 1) spaced apart the length of the chamber. The chamber is defined by a curved wall 34 having an arch-shaped cross section and defining an interior volume 36 of the chamber. The chamber wall 34 extends from a closed top side of the chamber to an open bottom side of the chamber. The wall 34 has opposite bottom side wall portions 38 disposed at the bottom side of the chamber.

The chamber wall 34 may be formed as a corrugated wall. Examples of corrugated wall constructions that may be adapted for use with the disclosed system include, but are not limited to, those disclosed in Maestro, U.S. Pat. No. 6,361,248, DiTullio U.S. Pat. No. 7,2226,241, and Mailhot et al. U.S. Pat. No. 8,672,583, each patent identified in this paragraph being fully incorporated by reference herein.

The chamber 16 has pairs of upper and lower side walls 40, 42 disposed inside the chamber interior 36 that extend the length of the chamber 16. The pairs of side walls 40, 42 function as locating structure that holds and locates filter cartridge(s) inside the chamber 16 as will be described in more detail below.

The pairs of walls 40, 42 are closely spaced from the bottom side of the chamber as compared to the top side of the chamber. Each pair of the side walls 40, 42 extend from the chamber wall partially into the interior volume 36 to define a pair of opposing channels or slots 44, 46 extending the full length of the chamber 16 and open to the interior of the chamber.

The bottom of the chamber 16 rests on a porous underlying substrate 48. The illustrated substrate is a stone base, but other porous substrates such as large-grained sand, gravel, crushed rock, or other water-permeable particulate mediums may be used with other embodiments of the system 10. The porous substrate stores water in the gaps between the aggregate and so provides additional water storage capacity for the stormwater management system. The chamber 16 may include conventional flanges, plates, or thickened wall portions (not shown) located at the bottom side of the chamber that resists sinking of the chamber wall 34 into the substrate.

Figure 3:
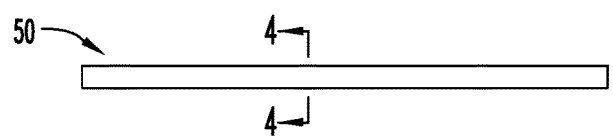
FIG. 3 is a front view of a filter cartridge for use with the chamber shown in FIG. 2.
Figure 4:
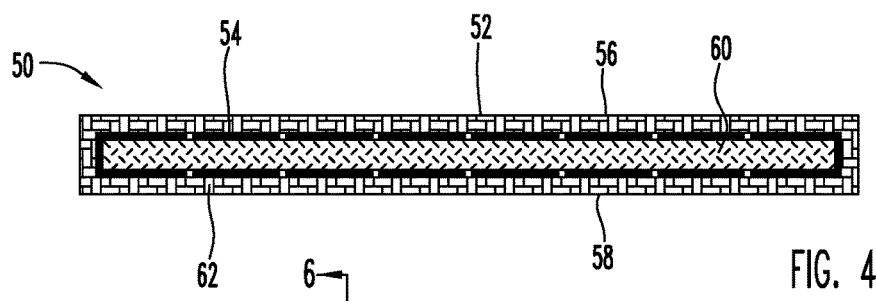
FIG. 4 is a sectional view of the filter cartridge taken along lines 4-4 of FIG. 3.

FIGS. 3 and 4 are front and sectional side views respectively of a filter cartridge 50. The filter cartridge 50 is sized to be closely received in the channels 44, 46 and supported on the channel lower side walls 42 as will be explained in greater detail below.

The filter cartridge 50 includes a metal or plastic body 52. The body 52 has a top wall 56 spaced from a bottom wall 58. The illustrated filter cartridge 50 has the top and bottom walls 56, 58 spaced apart by about one inch. The body 52 has sufficient rigidity such that in use the filter cartridge acts as a rigid body during use, that is, the filter cartridge body 52 is sufficiently stiff that deflection of the filter cartridge when the filter cartridge is supported on the channel side walls 42 can be ignored.

The walls of the filter cartridge body 52 define an interior hollow body chamber that in in the illustrated embodiment is filled with sand 60. The sand can contribute to the overall stiffness of the filter cartridge body 52 or to the overall stiffness of the filter cartridge 50 as a whole. The sand is wrapped by a geotextile 54 that is attached to the filter cartridge 40 by being placed inside the body chamber. Geotextile in other embodiments of the filter cartridge may also be wrapped around the outside of the filter cartridge. The thickness of the geotextile 54 in the drawings is exaggerated for clarity.

Extending through the thickness of the top wall 56 and the bottom wall 58 are a number of through holes 62 that fluidly communicate the outside of the body 52 with the interior of the body 52. Water flow through the holes in the top wall 56 must flow through the geotextile 54 and the sand 60 to reach the holes in the bottom wall 58.

Figure 5:
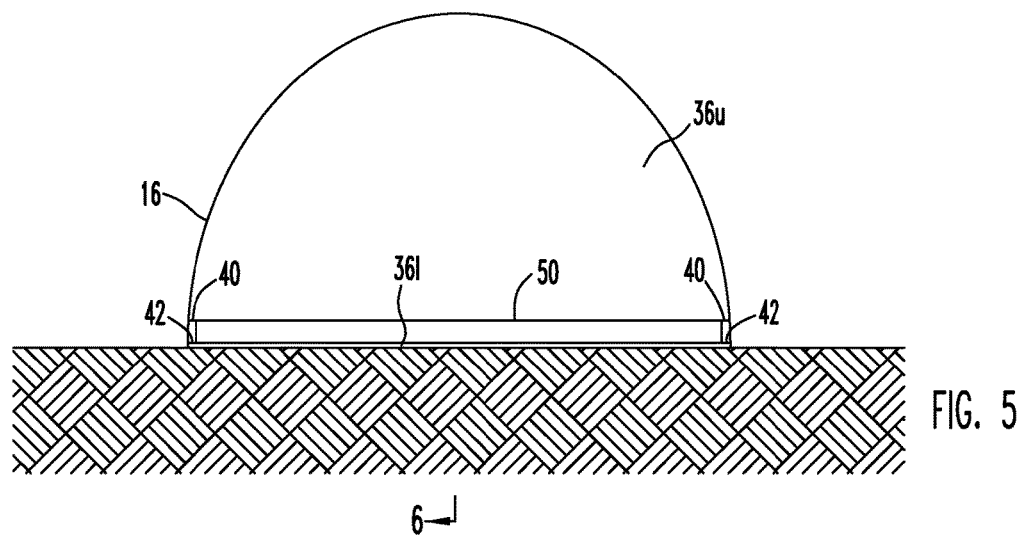
FIG. 5 is similar to FIG. 2 but with filter cartridges carried in the chamber.
Figure 6:
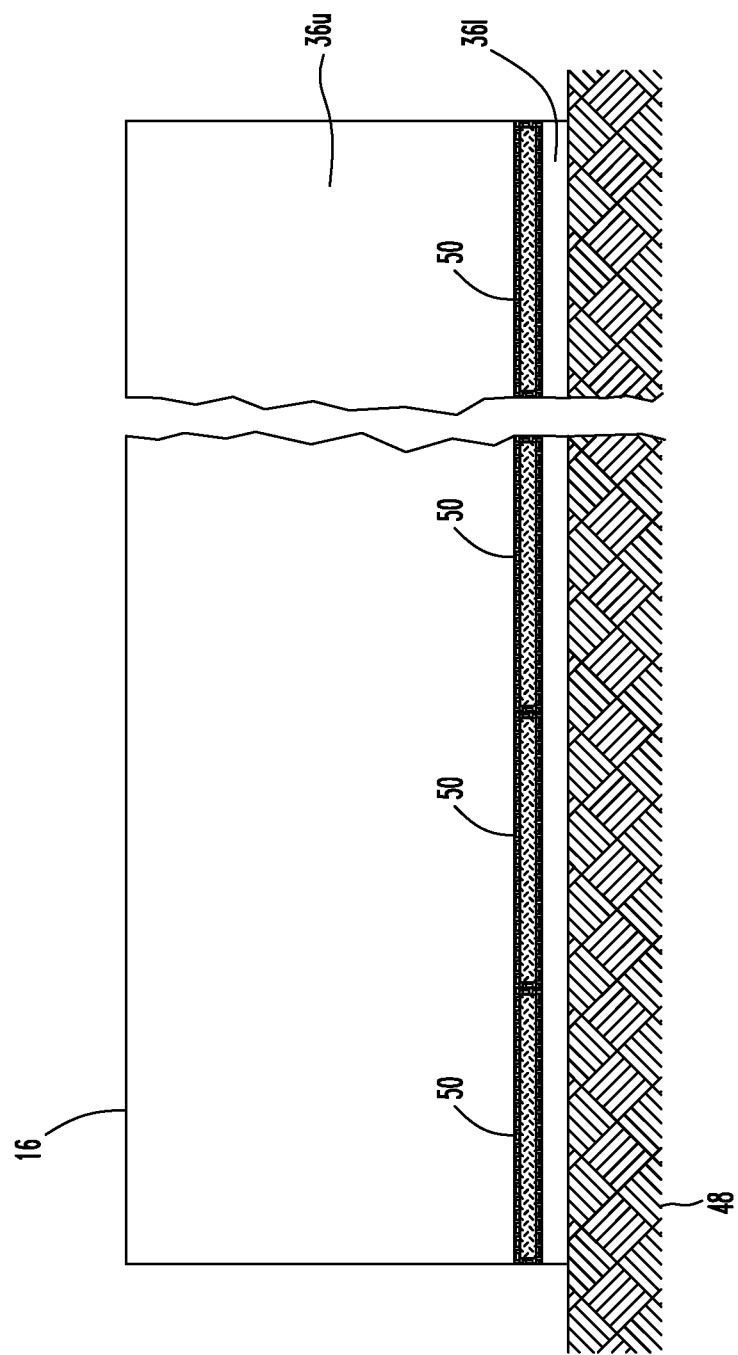
FIG. 6 is a sectional view of the chamber and filter cartridges taken along lines 6-6 of FIG. 5.

FIGS. 5 and 6 illustrate the system 10 ready for use, with a number of closely separated filter cartridges 50 held in the chamber channels 44, 46. The filter cartridges are preferably closely received in the chamber channels. The filter cartridges rest against and are supported on the channel lower side walls 42. The channel upper side walls 40 can also assist in resisting deflection of the filter cartridges. The bodies 52 of the filter cartridges have sufficient strength and rigidity to span the gap between the opposite chamber channels.

In the illustrated embodiment a filter cartridge 50 is about two feet in length, and so four cartridges extend the length of the chamber 16.

The channel lower side walls 42 space the filter cartridges 50 about one inch or so from the lower side of the chamber and so an inch or so above the stone base 48. The bodies 52 of the filter cartridges have sufficient strength and rigidity to span the gap between the chamber channels 44, 46 without the filter cartridges contacting the stone base. The filter cartridges cover essentially or substantially the full width and length of the bottom side of the chamber 16 while maintaining a generally uniform gap between the filter cartridges and the stone base.

The filter cartridges 50 divides the interior chamber volume into a relatively low volume, lower chamber portion 36l between the filter cartridges 50 and the stone base 48, and a relatively high volume, upper chamber portion 36u extending from the filter cartridges to the top of the chamber.

In operation, first flush enters the chamber 16 through the water inlet 20 and flows into the upper chamber volume 36u above the filter cartridges 50. Gravity urges the water in the upper chamber volume towards the bottom side of the chamber. First flush in the upper chamber volume must pass through the filter cartridges before reaching the bottom side of the chamber to be absorbed into the stone base 48. The first flush is filtered by the geotextile 54 and the sand 50, removing solid particulates and other contaminants from the first flush before the first flush reaches the bottom side of the chamber and is absorbed into the stone base.

When the useful life of the filter cartridges 50 is over, the filter cartridges are slid out of the chamber 16 and new cartridges 34 slid into the chamber.

A chamber 16 may be assembled from a number of chamber modules 64. See FIG. 7. A number of chamber modules are placed end to end to form the chamber 16. Such modular construction of a chamber 16 is conventional and so will not be described in detail.

Each chamber module 64 includes pairs of upper and lower side walls 66, 68 that, when the chamber modules are assembled to form the chamber 16, cooperate to form the upper and lower side walls of the chamber channels 44, 46. The forward end portions 70, 72 of the module side walls 66, 68 of the chamber module are preferably not parallel with one another but extend away from each other as the wall end portions 70, 72 extend toward the front end 74 of the chamber module. The flared ends of the side walls 70, 72 enable filter cartridges 50 to slide along the channels 44, 46 for insertion into or removal from the chamber 16 without interference from adjacent, possibly misaligned ends of the side walls of adjacent pairs of chamber modules.

In possible embodiments of the disclosed system a filter cartridge 50 may have engagement features that cooperate with the engagement features of an adjacent filter cartridge to resist relative movement between adjacent filter cartridges. Such engagement features might include interlocking slots and tabs or other arrangements known to persons of ordinary skill in the art.

In the illustrated embodiments the filter cartridges(s) 50 are removably fastened to the chamber 16 by friction, that is, friction forces generated between the filter cartridges and the chamber side walls 40, 42 resist relative motion of the filter cartridges with respect to the chamber. In other embodiment of the disclosed system filter cartridges accessible to workers in the manhole 12 may be releasably fastened to the chamber by screws or similar mechanical fasteners that fasten the filter cartridges to the chamber wall 34 and/or to the chamber locating structure (side walls 40, 42).

In yet other possible embodiments of the disclosed system, a chamber 16 and filter cartridge(s) 50 may be used without a manhole 12 if alternative access to the chamber 16 is provided for installing and replacing the filter cartridge(s).

In further embodiments of the disclosed system, the number of filter cartridges 50 may vary from the illustrated embodiments, that is, a single filter cartridge may extend the length of the chamber, 2 or 3 filter cartridges may extend the length of the chamber, or 5 or more filter cartridges may extend the length of the chamber 16.

In embodiments of the disclosed system in which filter cartridges 34 must pass in and out of the manhole 12, the filter cartridge size may be limited by the geometry of the manhole 12.

In yet other embodiments of the disclosed system the sides of the filter cartridge 34 adjacent the wall 22 during use may be curved or shaped to more closely conform to the curvature of the wall 22.

In alternative embodiments of the disclosed system a filter cartridge may include different filtering materials, or only a single layer of filtering material, or may include additional layers of filtering materials than the illustrated filter cartridge.

In additional possible embodiments of the disclosed system the wall of the first flush chamber may include spaced apart through holes 76 (represented by the circles drawn in phantom lines in FIG. 1) that open into the upper volume of the chamber. First flush would enter the upper volume of the chamber through the perforations and would be filtered as described above before reaching the underlying permeable substrate.

While one or more embodiments have been disclosed and described in detail, it is understood that this is capable of modification and that the scope of the disclosure is not limited to the precise details set forth but includes modifications obvious to a person of ordinary skill in possession of this disclosure, including the following claims.

What is claimed is:

1. An underground stormwater management system comprising:
    a chamber, a water inlet, and at least one filter cartridge being disposed inside the chamber, the chamber being covered by a water-porous material and disposed on a porous substrate;
    the chamber comprising a closed top side and an open bottom side separated by a height of the chamber, opposite front and back ends separated by a length of the chamber, the chamber enclosing an interior volume of the chamber, the bottom side of the chamber being adjacent to the substrate;
    the chamber having an arch-shaped cross section extending in the length direction from the front end to the back end of the chamber extending in a height direction from the closed top side of the chamber to the open bottom side of the chamber;
    the at least one filter cartridge being releasably held to the chamber;
    the at least one filter cartridge being spaced above the bottom side of the chamber, the at least one filter cartridge substantially closing the bottom side of the chamber and dividing the interior volume of the chamber into a lower volume between the at least one filter cartridge and the bottom side of the chamber and an upper volume between the at least one filter cartridge and the top side of the chamber;
    the at least one filter cartridge comprising filtering material fluidly connecting the upper volume and lower volume of the chamber; and
    the water inlet opening into the upper volume of the chamber;
    whereby water in the upper volume flowing to the bottom end of the chamber flows through the filtering material and is filtered by the filtering material.

2. The underground stormwater management system of claim 1 further comprising:
    the chamber comprising a pair of spaced apart opposite wall portions extending the length of the chamber, each wall portion extending from the bottom side of the chamber towards the top side of the chamber; and
    a respective first side wall being attached to each chamber wall portion inside the chamber and extending along the length of the chamber, the at least one filter cartridge being disposed on the pair of first side walls.

3. The underground stormwater management system of claim 2 comprising:
    a respective second side wall being attached to each chamber wall portion inside the chamber and extending along the length of the chamber, the at least one filter cartridge being disposed between the pairs of first and second side walls.

4. The underground stormwater management system of claim 3 wherein each pair of first and second side walls have flared end portions at the first end of the chamber.

5. The underground stormwater management system of claim 2 wherein the at least one filter cartridge comprises a rigid body supported on the pair of first side walls.

6. The underground stormwater management system of claim 2 wherein the chamber comprises a plurality of chamber modules placed adjacent to one another along the length of the chamber from the first end of the chamber to the second end of the chamber, each chamber module comprising a respective first side wall portion of the pair of first side walls.

7. The underground stormwater management system of claim 6 wherein at least one of said chamber modules comprises a respective second side wall portion spaced from and facing each first side wall portion, the respective pair of first and second side wall portions having end portions that extend away from each other as the end portions extend toward the first end of the chamber.

8. The underground stormwater management system of claim 1 wherein said at least one filter cartridge is spaced away about one inch from the bottom side of the chamber.

9. The underground stormwater management system of claim 1 comprising mechanical fasteners removably fastening the at least one filter cartridge to the chamber.

10. The underground stormwater management system of claim 1 wherein the at least one filter cartridge comprises a rigid body and a geotextile attached to the body.

11. The underground stormwater management system of claim 1 wherein the filtering material of the at least one filter cartridge comprises a geotextile disposed within a rigid body.

12. The underground stormwater management system of claim 1 wherein the filtering material of the at least one filter cartridge comprises a porous aggregate held in a rigid body.

13. The underground stormwater management system of claim 1 wherein the at least one filter cartridge comprises a rigid body having a plurality of through holes fluidly communicating the upper chamber volume with the lower chamber volume.

14. The underground stormwater management system of claim 1 comprising a manhole fluidly connected to the water inlet by a conduit.

15. The underground stormwater management system of claim 14 comprising additional chambers fluidly connected to the manhole by additional conduits.

16. The underground stormwater management system of claim 1 wherein said water inlet comprises a plurality of flow openings, each flow opening fluidly communicating the interior upper volume of the chamber with the aggregate material outside of the chamber.

17. A filtering assembly for filtering stormwater comprising:
a chamber, a water inlet opening into the chamber, and at least one filter cartridge disposed inside the chamber;
the chamber comprising a closed top side and an open bottom side spaced apart by a height of the chamber, opposite front and back ends spaced apart by a length of the chamber, a wall,
the chamber having an arch-shaped cross section extending from the front end to the back end of the chamber, the chamber defining an interior volume of the chamber;
the at least one filter cartridge releasably held to the chamber;
the at least one filter cartridge spaced above the bottom side of the chamber, the at least one filter cartridge substantially closing the bottom end of the chamber and dividing the interior volume of the chamber into a lower volume between the at least one filter cartridge and the bottom side of the chamber and an upper volume between the at least one filter cartridge and the top side of the chamber;
the at least one filter cartridge comprising filtering material fluidly connecting the upper volume and lower volume of the chamber; and
the water inlet opening into the upper volume of the chamber,
whereby water in the upper volume flowing to the bottom end of the chamber flows through the filtering material and is filtered by the filtering material.

18. The filtering assembly of claim 17 further comprising:
the chamber comprising a pair of spaced apart opposite wall portions extending the length of the chamber and extending from the bottom side of the chamber towards the top side of the chamber;
a respective pair of spaced-apart upper and lower side walls attached to each wall portion, the lower side wall of each pair of upper and lower side walls being closely spaced from the bottom side of the chamber;
each pair of upper and lower side walls defining a respective channel extending along the length of the chamber; and
the at least one filter cartridge being disposed in the pairs of channels and slideable in the pairs of channels along the length of the chamber for insertion into or removal from the channels of the at least one filter cartridge.

19. The filtering assembly of claim 18 wherein portions of each pair of upper and lower side walls adjacent to the first end of the chamber extend away from each other as the first and second side wall portions extend towards the first end of the chamber.

20. The filtering assembly of claim 17 wherein the at least one filter cartridge comprises a rigid body that supports the filtering material, the filtering material comprising at least one of a geotextile and a porous aggregate.

* * * * *